Jan. 23, 1934.   O. G. RUTEMILLER ET AL   1,944,761
REVERSIBLE SPRING RESET LIMIT SWITCH
Filed Aug. 13, 1931   6 Sheets-Sheet 1

WITNESSES:
R. S. Williams
P. E. Friedemann

INVENTORS.
Oren G. Rutemiller and
George E. King.
BY
W. R. Coley
ATTORNEY

Jan. 23, 1934.  O. G. RUTEMILLER ET AL  1,944,761
REVERSIBLE SPRING RESET LIMIT SWITCH
Filed Aug. 13, 1931   6 Sheets-Sheet 3

WITNESSES:
R. S. Williams
P. E. Friedemann

INVENTORS.
Oren G. Rutemiller and
George E. King.
BY
W. R. Coley
ATTORNEY

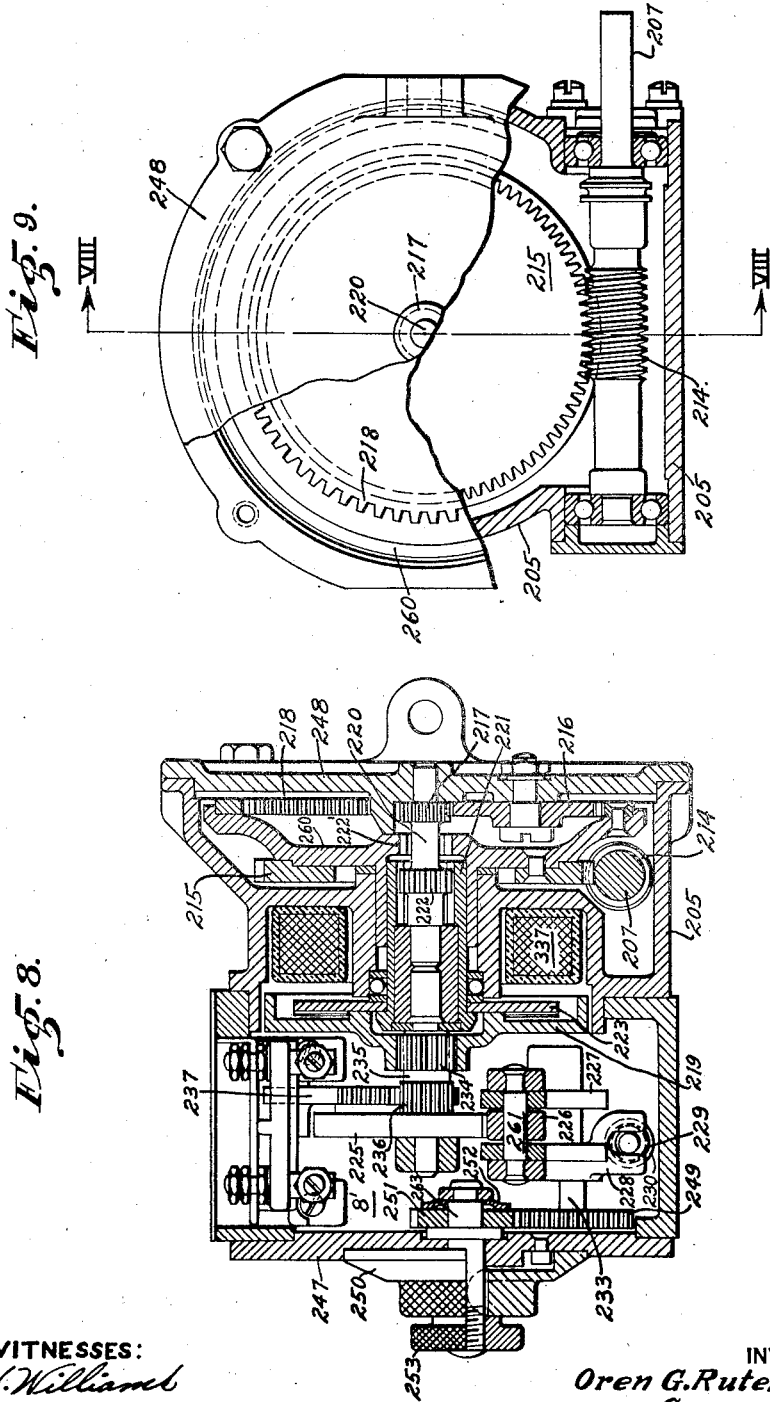

Jan. 23, 1934.    O. G. RUTEMILLER ET AL    1,944,761
REVERSIBLE SPRING RESET LIMIT SWITCH
Filed Aug. 13, 1931    6 Sheets-Sheet 6

WITNESSES:
R. S. Williams
P. E. Friedemann

INVENTORS.
Oren G. Rutemiller and
George E. King.
BY W. R. Coley
ATTORNEY

Patented Jan. 23, 1934

1,944,761

UNITED STATES PATENT OFFICE 1,944,761

REVERSIBLE SPRING RESET LIMIT SWITCH

Oren G. Rutemiller and George E. King, Wilkinsburg, Pa., assignors to Westinghouse Electric and Manufacturing Company, a corporation of Pennsylvania Application August 13, 1931. Serial No. 556,790

6 Claims. (Cl. 172—239)

Our invention relates generally to devices for controlling the operating characteristics of motor-driven machines.

More particularly, our invention relates to spring-reset limit switches which may be used as measuring and control devices on machines, such as planers, millers, grinders, screw-down mechanisms for rolling mills, shears, saws or any other machine where a feeding motion or a retrieving motion in a given direction is to take place periodically in definite increments or decrements of distance.

One object of our invention, generally stated, is the provision of a measuring machine that shall be simple in structure, capable of being readily and economically manufactured and efficient and reliable in operation.

A more specific object of our invention is to control the direction of operation of a motor and, more particularly, to control, within substantially definite limits, the number of revolutions of an electric motor driving a screw-down mechanism of a rolling mill, a tool-feeding mechanism of a planer or similar device.

A further object of our invention is to provide a measuring device which may be set to make a predetermined measurement and which will, upon the completion of the measurement, automatically stop and reset itself to repeat the measurement when it is again started in operation.

It is also an object of our invention to substantially prevent over-travelling of the controlled motor and, in the event of a slight over-travel, to reverse the motor, and again reverse the motor, if necessary, to thereby accurately position the element driven by the motor to the position selected by the measuring device.

Other and more specific objects of this invention will become readily apparent from a study of the following specification, when taken in conjunction with the accompanying drawings, in which:

Fig. 8 is a vertical sectional view, taken substantially along line VIII—VIII of Fig. 9, showing the mechanical features of a modification of our invention;

Fig. 9 is a rear view of the modification shown in Fig. 8; parts being broken away to more clearly show some details.

Figure 6:
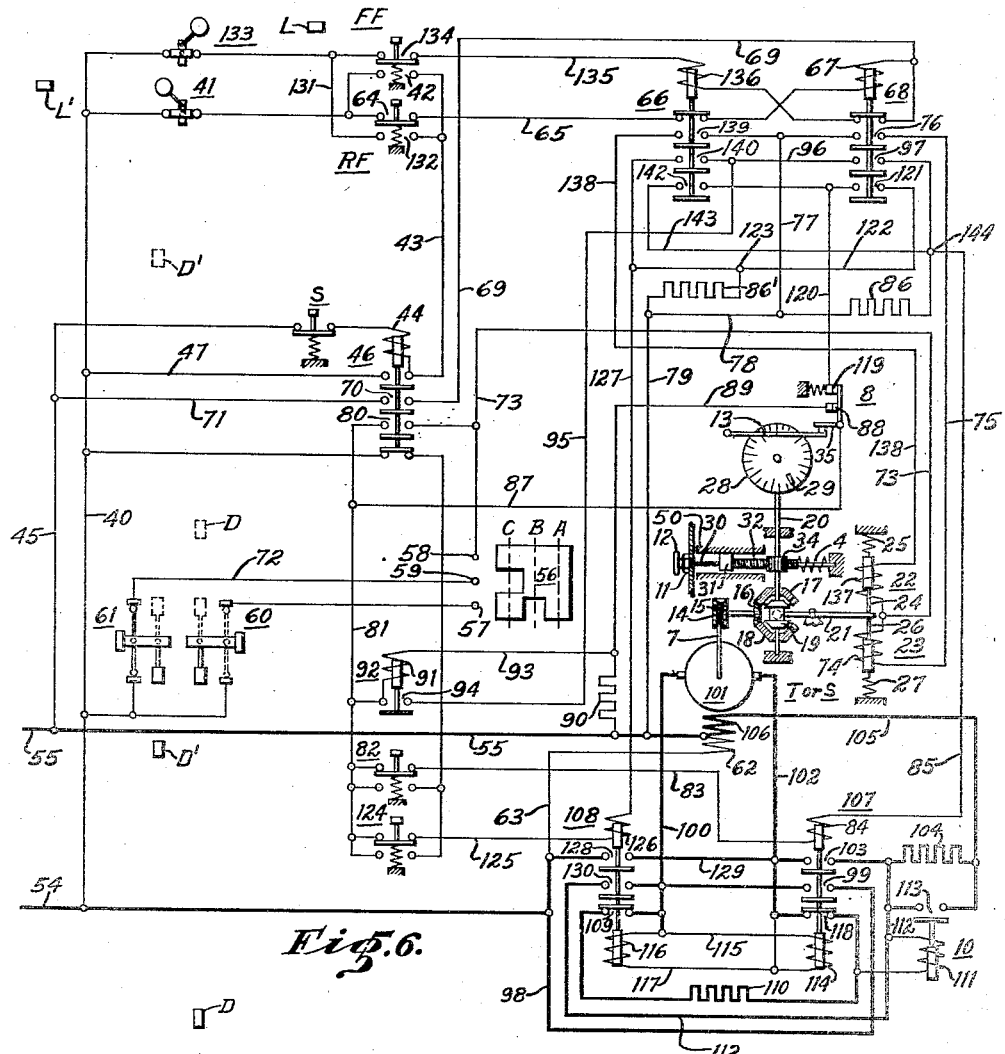
Fig. 6 is a diagrammatic view of the electrical control system for controlling the operation of an electric motor in response to the spring-reset limit switch and measuring device.
Figure 7:
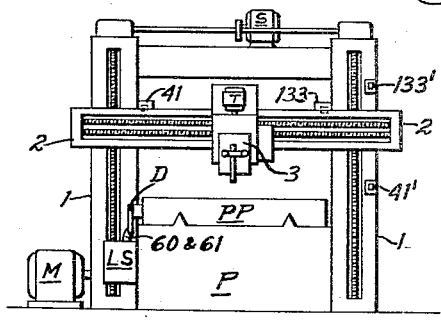
Fig. 7 shows, in elevation, a planer provided with a tool-feeding motor and a screw-down motor, one or both of which may be controlled by one or more reset limit switches.

Referring to the drawings and more particularly to Figs. 6 and 7, P designates a planer showing the standards 1, the cross-rail 2 for carrying the tool-head 3 and the motor S for operating the screw-down mechanism for the cross rail. The main motor M is disposed to operate the planer platen PP in a reciprocatory manner, and the planer platen is provided with a plurality of staggered dogs D and D' which cooperate with the lever arms of the limit switches 60 and 61 mounted in the casing LS.

During the normal operation of the planer, it is necessary that the tool or the tool-head 3 be shifted or fed in a given direction, either at the end of the cutting stroke or at the end of the return stroke, or, when desirable, at the end of both strokes. The tool-feeding operation is effected by the motor T, and the control for this motor through the spring-reset limit switch more particularly described hereinafter, is mechanically and electrically interconnected with the control scheme of the main motor M in such manner that the tool may be fed to the right or to the left at the end of either one or both of the strokes of the planer platen.

This invention is, however, not limited to the control of the feeding motor T, but the motor S for operating the screw-down mechanism for the cross-rail 2 may also be interconnected with the control system for the main motor M in such manner that the cross-rail is fed downwardly in response to the reciprocations of the planer platen. Where desirable, both motors T and S may be caused to operate at the ends of the movements of the planer platen. The tool-head 3 is disposed to coperate with a pair of limit switches 41 and 133, by means of which the feeding motor T may be stopped completely when the tool-head 3 has been moved to its extreme positions. Similarly, the vertical standards 1 are provided with limit switches 41' and 133' to limit the vertical movement of the cross-rail between predetermined limits by effecting the stopping of the motor S.

The mechanical arrangement of the spring-reset limit switch is more particularly shown in Figs. 1, 2, 3, 4 and 5, wherein reference numeral 5 designates the casing which embodies a plurality of supports for the operating mechanism and also acts as a protective covering therefor.

In order that the spring-reset limit switch may control the operation of the motor to be controlled, a shaft 7, journalled in the casing 5, is connected directly to the armature shaft of the motor T or that of the motor S, as the case may be. This mechanical connection may also be effected through suitable gearing, whereby the speed of the operating parts of the limit switch may be materially less than the speed of the motor shaft.

The shaft 7 is provided with a worm 14 which engages a worm wheel 15 mounted on a horizontal shaft disposed in the housing 5. Keyed to the shaft carrying the worm wheel 15 is a bevelled gear wheel 16 which meshes with a pair of bevelled gear wheels 17 and 18 loosely mounted on a shaft 20.

To effect the desired controlling operation, it is preferable that shaft 20 operate in the same direction, regardless of the direction of rotation of the shaft 7. This desirable function may be accomplished by the selective clutch mechanism controlled by the electromagnets 22 and 23 which are selectively energized in response to the direction of rotation of the motor to be controlled.

The electromagnets 22 and 23 are provided with coils 137 and 74 to be energized in a manner more specifically pointed out in connection with the discussion of Fig. 6. Associated with the respective movable armatures of these electromagnets is a pair of pins 24 and 26 biased to a given position by the springs 25 and 27, respectively. When the electromagnets are not energized, pins 24 and 26 hold the forked lever 21 in the position shown in Fig. 1. The forked lever 21 is provided with a pair of rollers 6 for engaging the clutch member 19 and is pivoted on a pin suitably mounted in the detachable frame portion 9 of the housing 5.

If one of the electromagnets be energized, the lever 21 is actuated, and the clutch member 19 engages either the gear wheel 17 or the gear wheel 18. The clutch member 19 is designed to freely rotate within the forked portions of the lever 21 and is securely attached to the shaft 20, as is obvious from inspection of Fig. 3. It will be apparent that for any rotation of shaft 7, the lever 21 may be shifted in such direction that the shaft 20 will rotate in the same direction.

Disposed above the electromagnets and the selective clutch mechanism is a shaft 30 mounted in suitable bearings of the casing 5. This shaft 30, (see Fig. 5) is provided with a hand wheel 12 and a manually operable set screw 11 for rigidly fixing the shaft with reference to the casing. The shaft is also provided with threads 30' and a movable nut 31 which may be shifted between the guides 50, longitudinally of shaft 30, by suitable manipulation of the hand wheel 12. As the nut 31 is shifted, the tubular member 51, provided with a rack 32 and also guided by the guides 50, may be shifted along the shaft 30. If the nut 31 be shifted to the right, the spring 4 is compressed, and the pinion 34 is operated in a clockwise direction by the rack 32.

The pinion 34 is keyed to the shaft 20 and will, therefore, cause the rotation of shaft 20 upon operation of the hand wheel 12. The upper end of shaft 20 is provided with a dial member 28 having graduations disposed along its cylindrical portion, and, when desired, its upper face portion. The graduations may be viewed at the window 33, more clearly illustrated in Figs. 2 and 4. An adjustable lug 29 is mounted on the upper face of the dial 28 and is disposed to operate a pivoted lever 13 which, in turn, may operate the bell-crank lever 35, thereby controlling the opening and closing of the contact members 88 and 119 of the switch mechanism 8.

The calibrations on the dial 28 are arranged to read inversely to the movement of the dial itself when it is being driven by the motor to be controlled. This arrangement is employed to enable the operator of the machine to set the adjustable lug 29, with reference to the pivoted lever 13, at a point which corresponds to the preselected feeding operation to be effected.

In Fig. 6, the spring-reset limit switch is shown more or less diagrammatically to more clearly bring out its cooperation with the control scheme for controlling the extent of operation of the feed motor. The feed motor is designated by T or S, depending upon which motor it is desired to control, and is shown in cooperative relation to the selective clutch mechanism, the spring-reset feature, and the switching arrangement 8 of the control scheme. A manually operable controller, having a segment 56, is utilized to select a feeding operation for the motor T at both ends of the stroke of the planer platen, or at the end of the forward stroke or at the end of the return stroke. These controlling operations may be effected by shifting the controller to positions A, B and C, respectively. The limit switches 60 and 61, operated by the dogs D and D', are normally in open position during the movement of the planer platen. In the showing in Fig. 6, it is assumed that the planer platen has moved to one of its extreme positions and, in consequence, limit switch 60 is shown in open-circuit relation, whereas limit switch 61 is shown in closed-circuit relation.

Associated with the feeding motor are a pair of directional contactors 107 and 108 and a pair of control relays 66 and 68 for controlling the energization of the selective clutch mechanism. The system of control is also provided with an accelerating contactor 10 responsive to the counter-electromotive force of the feeding motor; a pair of inching push-button switches 82 and 124; a forward-feed push-button switch FF, and a reverse-feed push-button switch RF.

Other details of the system of control and of the mechanical features of the spring-reset limit switch will become more apparent from a detailed study of the operation of this device.

Assuming that the planer platen has moved the dogs D and D' to the positions shown by full lines in Fig. 6; that the dogs L and L' are mounted on the tool-head or on the cross-bar, as the case may be, in the positions shown in full lines, so that limit switches 41 and 133 are in their circuit-closing positions; and that the manually operable controller has been moved to position B, thereby bridging the contact fingers 58 and 59 by the controller segment 56.

If the attendant wishes to operate the motor T through a predetermined number of revolutions or fractions of revolutions to limit and measure accurately the extent of the feeding operation, the hand wheel 12 is operated to shift travelling nut 31. In so doing, the pinion 34 is operated by the rack 32, and the dial number 28 is shifted from its zero position, as indicated at the window 33, to the position selected by the operator. The dial 28 is graduated in inches and fractions of inches, or, when desirable, in any other units of measure. As the dial 28 rotates, and the distance selected by the attendant appears at the window, the shaft 30 and, in consequence, the dial 28, is accurately adjusted to indicate the distance the motor T is to feed the tool. The graduations on the dial 28 cooperate with an index, not shown, adjacent to the window. When this adjustment has been made, the spring 4 is subjected to compression, thereby urging the tubular member 51 and the rack 32 against the travelling nut 31. After locking the shaft 30 in the selected position by means of the manually operable lock nut 11, the motor T may be started by setting up the necessary operating circuits.

If it be desired to cause a forward feeding operation by the motor T, the push-button switch FF is operated, whereupon a circuit is established from conductor 54, through conductor 40, limit switch 41, contact members 42 of the forward-feed push-button switch FF, conductor 43, actuating coil 44 of the control relay 46, stop switch S and conductor 45, to the conductor 55. The conductors 54 and 55 lead to a suitable source of direct-current power, which may also supply the main motor M and the screw-down motor S.

With the energization of the actuating coil 44, the control relay 46 establishes its own holding circuit, through conductors 40 and 47 and the uppermost contact members of the control relay 46, to the actuating coil 44 and thence to the conductor 55. The operation of the control relay 46 also establishes a circuit from the energized conductor 40, through the limit switch 41, closed contact members 64 of the reverse-feed switch RF, conductor 65, the back-contact members of the control relay 66, actuating coil 67 of the control relay 68, conductor 69, contact members 70 and conductor 71, to the energized conductor 45.

It will be noted that the operation of the control relay 46 causes the interruption of its back-contact members, thereby eliminating the possibility of interfering with the operation of the feed motor by inadvertent manipulation of the inching push-button switches 82 and 124.

Since the limit switch 61 is in a circuit-closing position for the assumed position of the planer platen, a circuit is established from the energized conductor 40, through the limit switch 61, conductor 72, contact fingers 59 and 58—bridged by the controller segment 56—conductor 73, contact members 80, of the control relay 46, conductors 81 and 87, contact members 88 of the switching mechanism 8 and conductor 89, to the junction of the conductors 93 and 89, through resistor 90, to conductor 55. It is thus apparent that a shunt circuit for the actuating coil 91 is established as long as the contact fingers 88 of the switching mechanism 8 are in circuit-closing positions, and the relay 92 can, therefore, not interfere with the operation of the directional contactor 108, as will be more apparent from the discussion of the operation of this directional contactor.

Before the feeding motor starts operating, it is desirable that the clutch mechanism for moving the dial member 28 operate strictly in response to the extent of rotation of the feed motor. This is accomplished by the operation of the control relay 68, which establishes a circuit from the energized conductor 73, through the actuating coil 74, conductor 75, contact members 76 and conductors 77, 78 and 79, to the energized conductor 55. The armature of the electromagnet 23 will thus be caused to move to compress spring 27, and the lever 21 will move the clutch mechanism 19 into engagement with the gear 17. Actuating coil 137 can, however, not be energized because the back contact members of relay 68 are open which thus prevent energization of control relay 66 designed for energizing electromagnet 22.

Since the operation of the control relay 46 causes energization of the conductor 81, a circuit is established from this conductor, through the upper or back-contact members of the inching switch 82, conductor 83, actuating coil 84 of the directional contactor 107 and conductor 85, to the junction 144, through resistor 86 and conductors 78 and 79, to the energized conductor 55. The motor, since the shunt field windings are already energized from the conductor 54, through the conductor 63, shunt field winding 62, to the conductor 55, is now ready to operate by a motor circuit from the conductor 54, through conductor 98, contact members 99, conductor 100, armature 101, conductor 102, contact members 103, accelerating resistor 104, conductor 105 and a series of field winding 106, to the conductor 55.

The circuit for the directional contactor 107 is carried to the junction 144 from the energized conductor 81, whereby the actuating coil 84 will be shunted if, for any reason, the control relay 92 be energized to establish a circuit from conductor 81, through the contact members 94, conductors 95 and 96 and contact members 97, to the junction 144. The energization of the actuating coil 91, as has been pointed out, is, however, controlled by the contact member 88 of the spring-reset switching mechanism 8.

If the motor were to feed in the reverse direction, it is, of course, obvious that the directional contactor 108 should be energized. However, to eliminate the possibility of interfering with the forward-feed direction heretofore discussed, a shunt circuit is established for the actuating coil 126 of the directional contactor 108. This shunt circuit may be traced from the energized conductor 81, through the conductor 87, contact members 119 of the switching mechanism 8, conductor 120, contact members 121 and conductor 122, to the junction 123. In the absence of this shunt circuit, the actuating coil 126 would be energized from the energized conductor 81, through the upper or back-contact members of the inching push-button switch 124, conductor 125, actuating coil 126 and conductor 127, to the junction 123. From the junction 123, the circuit is completed, through the resistor 86' and conductor 79, to the conductor 55. It is thus apparent that the directional contactor 108, when the motor is operating in the forward direction, is shunted, and the shunt circuit is under the control of the contact members 119.

As the motor begins to operate in a conventional manner in the forward-feed direction, it accelerates in the usual manner and, when the counter-electromotive force has attained a predetermined value, as determined by the accelerating relay 10, this relay at the contact members 113, shunts the starting resistor 104, thereby bringing the feeding motor up to normal speed. The actuating coil 111 of the accelerating relay 10 is connected across the armature terminals of the feeding motor by a circuit extending from the conductor 100, through the back-contact members 109, dynamic-braking resistor 110, actuating coil 111, conductor 112 and contact members 103 (now closed), to the conductor 102. Since the clutch member 19 engages the gear 17, the dial member 28, referring to Fig. 6, is driven in a counter-clockwise direction and, when the feeding operation is completed, that is, when the adjustable lug 29 has moved from the position of its adjustment by the hand wheel 12 to engage the pivoted lever 13, the contact members 88 are caused to interrupt the shunt circuit for the actuating coil 91 of the control relay 92, thereby immediately establishing a shunt circuit for the actuating coil 84 of the directional contactor 107. This shunt circuit for the actuating coil 84 extends from the energized conductor 81, through the contact members 94, to the junction 144, as above explained. The directional contactor 107, being thus deenergized, immediately interrupts its contact members 99 and 103 and closes the back-contact members 118.

The directional contactors 107 and 108 are provided with back coils 114 and 116 which are responsive to the counter-electromotive force of the feeding motor T. Obviously, the instant the contact members 99 and 103 open, both of the coils 114 and 116 through conductors 115 and 117, are subject to the full effect of the counter-electromotive force of the feeding motor, thereby firmly sealing the back-contact members 109 and 118 to circuit-closing position, and the armature 101 of the feeding motor is thus connected in circuit relation, through conductors 102, contact members 118, and conductor 100 and contact members 109, to the dynamic-braking resistor 110. The resistance value of the resistor 110 is comparatively low, so that the motor will stop within a very short interval of time, thereby fixing the extent of operation of the feeding motor to within comparatively accurate limits.

However, in the event that the armature 101 of the feeding motor overtravels, thereby causing an excess of feed of the tool head, or an excessive moving of the screw-down mechanism of a rolling mill or the cross head of a planer, the dial mechanism 28 and the lug 29 will be moved a corresponding excessive amount, that is, beyond the zero position, thereby causing the interruption of the shunt circuit for the actuating coil 126 of the directional contactor 108 at the contact members 119. The directional contactor 108 will thus establish an armature circuit for the feeding motor from the conductor 54, through the contact members 128, conductor 129, conductor 102, armature 101, conductor 100, contact members 130, conductor 112, accelerating resistor 104, conductor 105 and the series field winding 106, to the conductor 55. The motor will thus immediately begin to operate in a reverse direction to retract the tool from its position of excessive feed and again position the dial number 28 to its zero reading.

As the dial member 28 and the lug 29 are moved to their zero positions, the shunt circuit for the actuating coil 126 will first be established at the contact members 119, and again the motor will be brought to rest by setting up a dynamic-braking circuit through the braking resistor 110. If, for any reason, the tool be retracted too much while the dial 28 is moved in the reverse direction, the shunt circuit for the actuating coil 91 is again established at the contact members 88, with the result that the shunt circuit for the actuating coil 84 of the forward directional contactor 107 is removed, thereby establishing a circuit for the motor in the forward direction. The motor, therefore, will eventually come to rest when the contact members 88 are in open-circuit position, and the contact members 119 are in closed-circuit position, thereby accurately predetermining the number of revolutions or fractions of revolutions of the armature 101 of the feed motor. In short, the motor armature may be controlled to move through a predetermined angle each time it is set into operation.

In the meantime, the system of control for the main motor M will have caused that motor to reverse the direction of motion of the planer platen PP, thereby causing the dogs D' and D to move in an upward direction. The dog D', during the initial movements of the planer platen, engages the operating lever of the limit switch 61, thereby interrupting the circuit from the conductor 54 to the conductor 72. Since the dog D is positioned at the other end of the planer platen, the switches 60 and 61 will remain in open-circuit position for the entire stroke of the planer platen, thereby making it impossible to operate the feeding motor during the movement of the planer platen, or, if the subject matter of this invention be utilized with a rolling mill, the screw-down motor is prevented from operating while the steel moves through the rolls.

At the end of the return stroke, the dog D engages the operating lever of the limit switch 60, thereby establishing an energizing circuit from the conductor 54, through the limit switch 60, to the contact finger 57. If the controller segment 56 be in the position B above assumed, no operating circuit can be established for the feed motor at the end of the return stroke, and all the feeding of the tool, or the operation of the screw-down mechanism, takes place at the end of the cutting stroke. However, if the controller segment be in position C, then contact fingers 57 and 58 are bridged by the controller segment 56, and the feeding motor can only be operated at the end of the return stroke, whereas, for position A, all of the contact fingers 57, 58 and 59 are bridged by the controller segment 56, and feeding can take place not only at the end of one stroke but at the end of both strokes. This latter feature of feeding at the end of both strokes may, at times, be very desirable and has a tendency to speed up the operation of the planer, particularly where the depth of each cut is to be considerable and yet the reciprocatory motion of the planer platen should not be retarded. Obviously, in such case, the time at the end of each stroke of the planer platen may be comparatively small, and the amount of feeding of the tool is thus effected by two equal increments at each end of the stroke.

It is, of course, obvious that, if the motor is to operate in a reverse direction, as may be the case when a casting is being undercut and the tool is to move in an upward direction, or when traversing a wide piece of work the tool may be moved in increments across the surface in either direction, the push button switch RF is caused to establish a circuit from the energized conductor 40, through the limit switch 133 and the contact members 132, to the actuating coil 44 of the control relay 46. A further circuit is established for the actuating coil 136 for the control relay 66. This circuit may be traced from the energized conductor 40, through the limit switch 133, the upper or back contact members 134 of the forward-feed switch FF, conductor 135, actuating coil 136, the uppermost or back-contact members of the control relay 68, to conductor 69 and contact members 70, to the energized conductor 45. With the operation of the control relay 46 and the control relay 66, an energizing circuit is established for the actuating coil 137 of the electromagnet 22, thereby causing the clutch member 19 to engage the gear 18, thereby causing the shaft 20 to rotate in such manner as to move in a counter-clockwise direction. The circuit for the actuating coil 137 may be traced from the energized conductor 73 through actuating coil 137, conductor 138, contact members 139 of the relay 66, conductors 77 and 78 to the energized conductor 55. The operation of the contact members 88 and 119 and the control relay 91 is essentially the same for the reverse operation of the feeding motor T, except that the circuits for coils 84 and 126 are energized from conductor 143 and contact members 140 and 142, and need, therefore, not be discussed in detail. It is, of course, obvious that energization of the actuating coil 137 will operate the armature of the electromagnet 22 and the pin 24 against the bias of the spring 25.

Figure 5:
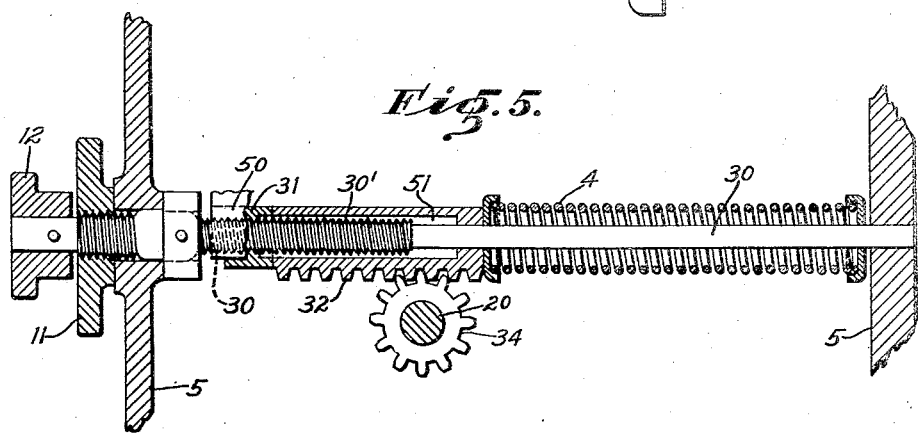
Fig. 5 is a detail sectional view of the spring-controlled reset features of the switch and measuring dial.

After each operation of the feeding motor, the circuit for the feeding motor and also the control system associated with this motor is interrupted by the limit switches 60 and 61 and, in consequence, the electromagnets 22 and 23, depending upon which one may have been energized, are deenergized, thereby disengaging the clutch member 19 from the one or the other of the gear wheels 17 and 18, as the case may be. The instant the clutch member 19 is thus free to rotate, the biasing spring 4 moves the rack member 32 toward the left until it again engages the travelling nut 31, as shown in Fig. 5. The pinion 34 will thus be rotated, thereby actuating the shaft 20 and the dial 28 to their adjusted positions. The dial 28, by its graduations adjacent to the index on the casing 5 at the window 33, will again indicate the preselected distance of travel of the tool to be controlled. If the feeding operation is to be changed it is merely necessary to readjust the travelling nut 31 by the hand wheel 12 to the new feeding position. In view of the fact that the limit switches 60 and 61 are in open-circuit position during the greater time of operation of the planer, the distance the tool is to be fed at the ends of the respective strokes may be adjusted while the planer is in operation.

The tool head is provided with lugs, such as are shown at L and L', which operate the limit switches 41 and 133. If the tool head is moved to its extreme position, the operation of the feeding motor is interrupted by the operation of the limit switches 41 and 133, as effected by the lugs on the tool-head. A similar arrangement, as is indicated at 41' and 133' (Fig. 7), is provided for the screw-down motor S.

While the invention has been disclosed as including a dial member operating in a single direction, we do not wish to be limited to such structure. Obviously, a heart-shaped cam or a cam of some other desirable construction may be associated with the dial and the spring biased member 51, whereby the dial is moved to a given angular position regardless of the direction of rotation of the shaft 20. For this suggested structure, the selective clutch member may be replaced by a single clutch member controlled by a single control electromagnet.

The member 51 will, obviously, for such modification, be replaced by a roller which will ride on the cam. The dial may either rotate in one direction or in the other direction, and be so designed by a proper disposition of the adjustable lug or lugs 29, or a disc may be coupled or keyed to the cam and a disc coupled to the dial. By mounting a number of pinions on the respective discs, the rotation of the dial may be effected in the same direction.

For a more complete understanding of the modification just discussed, references should be had to Figs. 8 to 11, inclusive.

Referring more particularly to Fig. 8, reference character 205 designates the casing, housing the various mechanisms constituting the spring reset limit switch. The shaft 207 is mechanically coupled to the motor to be controlled and operates in synchronism with the motor. The motor to be controlled, as hereinbefore pointed out, may be either the motor T operating the tool holder 3 or the motor S disposed to operate the screw-down mechanism for the cross head 2 of the planer P.

The shaft 207 is provided with a worm gear meshing with a worm gear wheel rigidly secured to a spider 260. The spider 260 also has rigidly secured thereto an annular internal gear wheel 218 meshing with a pinion 216 which, in turn, meshes with a pinion 217 on the shaft 220. The shaft 220 is also provided with an auxiliary gear 222. The shaft may be interchanged by the removal of the end wall 248 whereupon the gear 222 would be disposed in engagement with the internal gear 222' provided on the spider 260. This arrangement merely provides a different gear ratio between the shaft 207 and the switch mechanisms 8' operating both cam members 225 described more in detail hereinafter.

Figure 1:
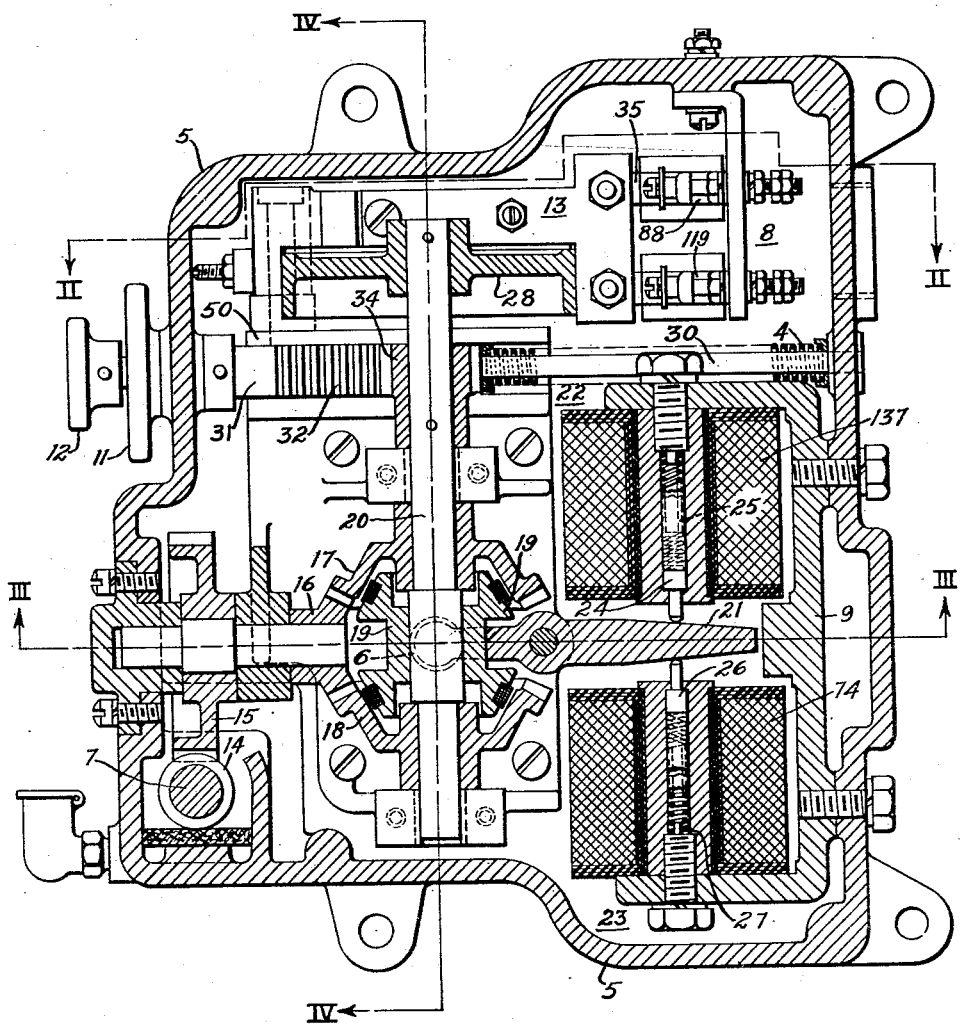
Figure 1 is a vertical sectional view, taken substantially along the line I—I of Fig. 2, showing the mechanical features of the spring-reset limit switch constituting part of our invention.
Figure 2:
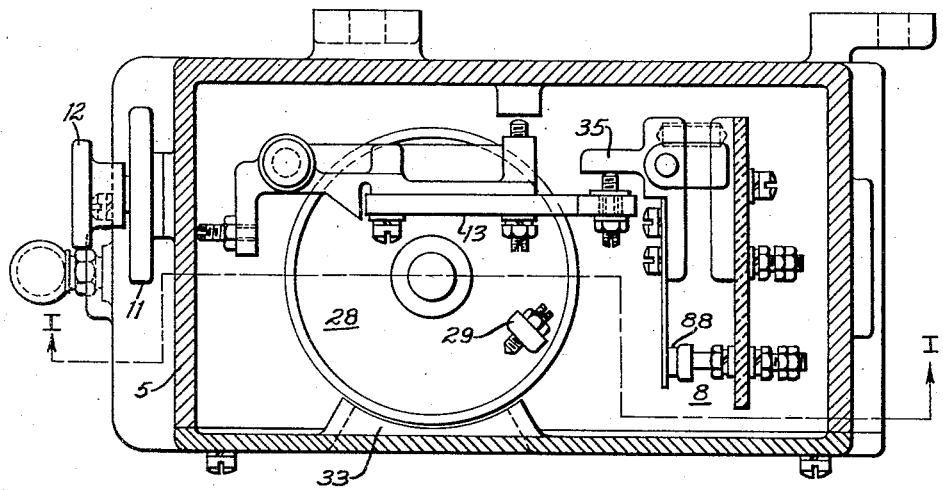
Fig. 2 is a sectional view, taken along line II—II of Fig. 1, showing in plan view, the measuring dial, switches and operating handles.
Figure 3:
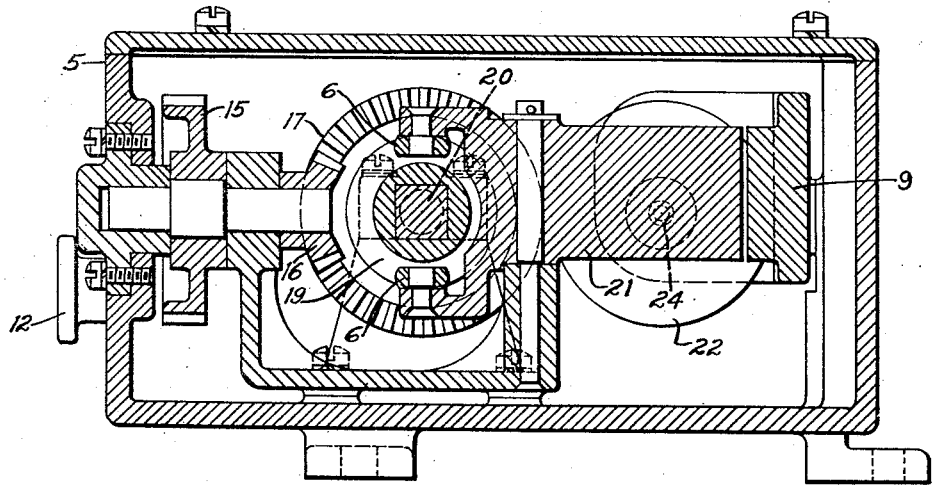
Fig. 3 is a sectional view, taken along line III—III of Fig. 1, showing the operating lever of the magnetically controlled clutch mechanism more clearly shown in Figs. 1 and 4.
Figure 4:
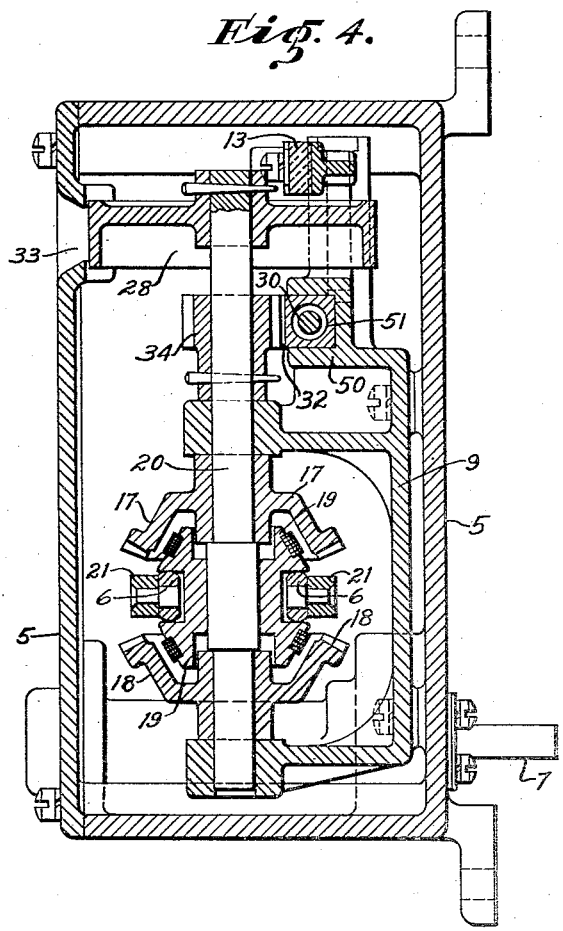
Fig. 4 is a sectional view, taken along line IV—IV of Fig. 1.

Disposed within the housing 205 is an electromagnet 337 which, when energized in a manner similar to the energization heretofore explained in connection with the modification particularly shown in Fig. 1, operates the armature 219 to cause the clutch members 223 to rigidly engage thereby operating the armature 219 in synchronism with the shaft 220. This operation is effected through the gear teeth mounted on the inner periphery of sleeve 221 engaging with the auxiliary gear 222 by a suitable mechanical connection, the clutch members 223 are rigidly coupled to the sleeve member 221. When the electromagnet 337 is energized, the shaft 235 is caused to operate through the pinion 234 meshing with all the teeth of the internal gear member on the armature 219. The utilization of a pinion 234 and a gear on the armature 219 provides for a greater variety of adjustments, however, it is obvious that the mechanical coupling would be completed if merely a spline were utilized between the shaft 235 and the armature 219.

Mounted on the shaft 235 is a heart shaped cam 225 cooperating with a roller 226 mounted on the sectors 227. The roller 226 is loosely mounted on the pin 261 and the sectors as well as the arm 228 are relatively movable to each other on the pin 261. The sectors are disposed to mesh with a pinion 262 (see Fig. 10) rigidly secured to the shaft 233. The shaft 233 also has rigidly secured thereto a gear wheel 249 meshing with a gear wheel 251 attached to the shaft 263 by a friction clutch 252. A dial member is rigidly keyed to the shaft 263 and by suitable manipulation of the dial member 250, the sectors may be shifted with reference to the arm 228 through the gears 251, 249 and pinion 262.

The arm 228 is provided with an extension 229 disposed to engage a spring 230. The spring 230, by its actuation on the arm 229, always maintains the roller 226 in cooperative engagement with the cam member 225. While the cam member has been designated by a certain shape, it is obvious that the cam surface may have any configuration desired so long as the required operation is accomplished.

The sectors 227 are provided with an arm 231 carrying a pin 232. Obviously, by suitable manipulation of the dial member 250 as heretofore explained, the position of the pin 232 with reference to the roller 226 may be altered. Not only does the actuation of the dial 250 change the position of the pin 232 with reference to the roller engaging the cam 225 but the position of the pin may be readily shifted with reference to the contact carrying arm 243. The contact carrying arm 243 is pivotally mounted at 244 and its initial position may be adjusted by the screw mechanism 246 engaging the bell crank lever 245 disposed to operate the contact carrying member 243.

When the cam 225 is caused to operate as heretofore explained, the roller is moved in a counter-clockwise direction about the shaft 233, and after the motor to be controlled has moved through a predetermined angle, or a predetermined number of revolutions or fractions of a revolution, the pin 232 engages the pivotally mounted contact carrying member 243 just above the spring 247' and causes the actuation of the contact members 8' in a manner similar to the operation of the contact members 8 heretofore described.

Figure 11:
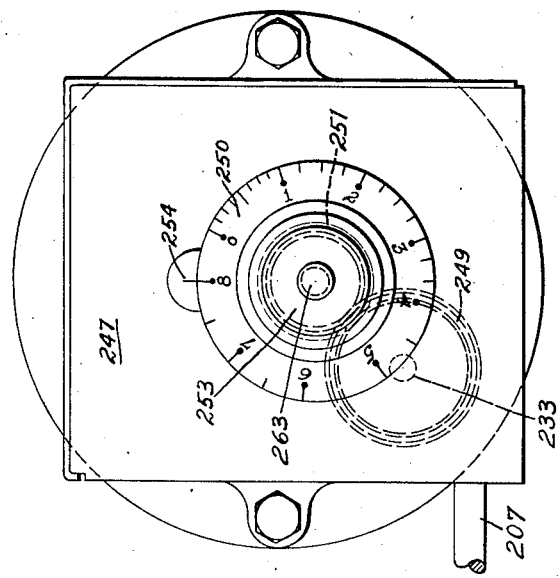
Fig. 11 is a front view showing the dial, of the modification shown in Fig. 8, in place.
Figure 10:
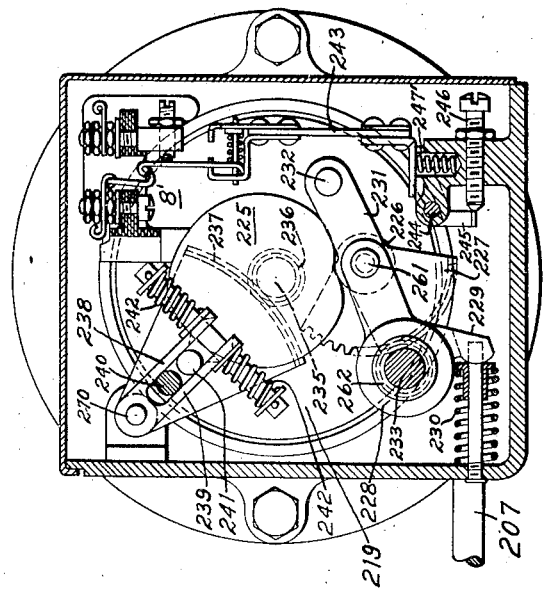
Fig. 10 is a front view, having the dial and front plate of the case shown in Fig. 11 removed.

As shown in Figs. 10 and 11, the position of the pin 232 is adjusted for the maximum travel, or the maximum number of revolutions of the motor to be controlled. It is, therefore, obvious that the contact members 8' will not be actuated until the cam 225 has rotated to a maximum position or, for the type of cam shown, through an angle of 180°. If it be desired that the motor to be controlled is to rotate through an angle less than maximum, the dial 250 may be adjusted for the increment desired, thereby positioning the pin 232 nearer the contact carrying member 243. The cam member 225 will therefore, move through a lesser angle before actuating the contact carrying member.

The dial member 250 is provided with a knurled lock nut 253 to fix the dial with reference to the index 254. However, the connection is not so rigid as to eliminate the function of the clutch 252. If, for any reason, the motor does not respond to the actuation of the contact carrying member 243, the cam 225 will continue to rotate driving the pinion 262 and the gears 249 and 251, but such operation will not be transferred to the dial nor cause any breakage of the sector, the pinion or any of the parts cooperating with the cam 225.

In order that the spring reset limit switch may, after each operation, return to its initial position, that is, the position for which the dial has been adjusted, a pinion 236 is mounted on the shaft 235. The pinion 236 meshes with a sector 237 pivotally mounted on the pin 270. The sector carries a pin 241 disposed intermediate the pivotally mounted arms 238 and 239 which arms are biased at the position shown in Fig. 10 by the springs 242. Rigidly secured to the face plate 247 of the housing 205 is a pin 240 also disposed intermediate the pivotally mounted arms 238 and 239. The pin or guide member supporting the springs is mounted rigidly with reference to the case 205. When the cam 225 is caused to operate in response to the operation of the motor to be controlled, the sector 237 will cause the pin 241 to move with reference to the pivot shaft 270.

Assuming that the cam moves in a clockwise direction, then the sector 237 rotates in a counter-clockwise direction carrying the pin and the arm 238 in the counter-clockwise direction, thereby compressing both of the springs 242 because the arm 239 will be held in a fixed position by the pin 240 rigidly secured to the face plate 247. If the rotation of the cam 225 is in a counter-clockwise direction, the movement of the pin 241, the sector 237 and the arm 239 will take place in clockwise direction while the arm 238 remains in a fixed position. From the foregoing discussion it is also obvious that the actuation of the contact carrying member 243 which causes the stopping of the motor to be controlled and also the deenergization of the electro-magnet 337 immediately releases the cam 225, and the springs 242, in conjunction with the sector 237 and pinion 236, return the cam to its starting position.

We do not wish to be restricted to the specific structural details, arrangement of parts or circuit connections herein set forth, as still other modifications thereof may be effected without departing from the spirit and scope of our invention. We desire, therefore, that only such limitations shall be imposed as are indicated in the appended claims.

We claim as our invention:

1. A measuring control device for controlling the operation of a motor comprising a casing, a spindle mounted in the casing and mechanically coupled to the motor to be controlled, a second spindle mounted in the casing, selective clutch means for causing the second spindle to operate in the same direction regardless of the direction of rotation of the motor, means for preselecting the number of revolutions the motor is to take at each operation, indicating means mounted on the second spindle, means for starting the operation of the motor and means controlled by the indicating means for stopping the motor when a preselected number of revolutions have been effected.

2. In a measuring control device for controlling the distance of travel of a motor-operated mechanism by predetermining the angular movement of the armature of the motor driving the mechanism, a motor, a measuring device, a clutch member for selectively connecting the measuring device to the motor to operate in synchronism with the motor and in the same direction, regardless of the direction of rotation of the motor, a dial member, an adjustable operating member on the dial member, a dynamic-braking circuit for the motor, switching means operated by the adjustable operating member to interrupt the operating circuit for the motor and establish the dynamic-braking circuit therefor, thereby quickly stopping the motor when rotated through a predetermined angle.

3. A measuring control device for controlling the distance of travel of a motor-operated member, a casing, a spindle in the casing connected to operate in synchronism with the member, a rotatable dial, a selective clutch element for effecting the same direction of rotation of the dial, regardless of the direction of operation of the member, means for adjusting the dial to a predetermined angular position with reference to a given angular position, and switching means operated by the dial to effect the stopping of the member when the dial is rotated to the given angular position.

4. A measuring control device for controlling the distance of travel of a motor-operated member, a motor for driving the member, a casing, a spindle in the casing connected to operate in response to the member, a rotatable dial, a selective clutch element for effecting the same direction of rotation of the dial, regardless of the direction of operation of the member, means for adjusting the dial to a predetermined angular position with reference to a given angular position, switching means operated by the dial for effecting the stopping of the member when the dial is rotated to the given angular position, and means for automatically repositioning the dial to the predetermined angular position when the motor has stopped.

5. A measuring control device for controlling the distance of travel of a motor-operated member, a motor for driving the member, a dynamic braking circuit for the motor, a casing, a spindle in the casing connected to operate in synchronism with the member, a dial rotated by the spindle, means for adjusting the dial to a selected angular position with reference to a given position, switching means for interrupting the motor circuit and establish said dynamic braking circuit to stop the member when the dial is rotated to the given position, and means for automatically repositioning the dial to the selected angular position.

6. In a measuring control device for successively starting a motor and stopping the motor when it has moved through a predetermined angle, a measuring dial adjustable to any position and operating in synchronism with the motor to be controlled, a dynamic-braking circuit for the motor, means responsive to a given selected position of the dial from an initial position to interrupt the motor circuit and establish the dynamic-braking circuit, means responsive to an over-travel of the dial to interrupt the dynamic-braking circuit and establish a motor circuit for reverse operation of the motor to retract the dial to again establish the dynamic-braking circuit, thereby stopping the dial at a preselected position with reference to its initial position.

OREN G. RUTEMILLER.
GEORGE E. KING.